United States Patent [19]

Hirotsune

[11] Patent Number: 5,471,295

[45] Date of Patent: Nov. 28, 1995

[54] ANGLE MEASURING METHOD AND APPARATUS USING PROJECTED GRAPHIC

[75] Inventor: Satoshi Hirotsune, Settsu, Japan

[73] Assignee: Matsushita Electric Industrial Co., Ltd., Osaka, Japan

[21] Appl. No.: 176,550

[22] Filed: Jan. 3, 1994

[30] Foreign Application Priority Data

Jan. 19, 1993 [JP] Japan ..................... 5-006400

[51] Int. Cl.$^6$ ................................ G01B 11/26
[52] U.S. Cl. ............................... 356/138
[58] Field of Search ..................... 356/138, 154; 348/744, 745

[56] References Cited

U.S. PATENT DOCUMENTS 4,721,386  1/1988  Collyer .

FOREIGN PATENT DOCUMENTS 0460947  12/1991  European Pat. Off. .
4-003042   1/1992  Japan .
4-042679   2/1992  Japan .
4-323979  11/1992  Japan .

*Primary Examiner*—F. L. Evans
*Attorney, Agent, or Firm*—Ratner & Prestia

[57] ABSTRACT

An angle measuring method comprising the steps of: forming an original graphic on an original graphic forming face; projecting the original graphic onto a screen so as to form a projected graphic on the screen; and deforming the original graphic so as to turn the projected graphic into a predetermined shape such that a first angle formed, in a first plane orthogonal to a reference installation face for installing the original graphic forming face and the screen, between the screen and a first perpendicular drawn relative to the reference installation face, a second angle formed, in a second plane parallel to the reference installation face, between the screen and the original graphic forming face and a third angle formed, in the first plane, between a second perpendicular drawn relative to the original graphic forming face and the reference installation face are obtained, and an angle measuring apparatus.

22 Claims, 10 Drawing Sheets

ANGLE MEASURING METHOD AND APPARATUS USING PROJECTED GRAPHIC

BACKGROUND OF THE INVENTION

1. Field of the Invention

The present invention relates to an angle measuring method and an angle measuring apparatus, which employ a projection type display.

2. Description of the Prior Art

In recent years, displays are developed for a larger screen, higher image quality and higher functions. As one example of a display having a large screen, a projection type display is well known in which an optical image is formed on a light valve and light is irradiated to the optical image such that the optical image is projected onto a screen on an enlarged scale by a projection lens.

However, in the known projection type display, a projector should be placed in front of the screen such that a normal vector of a face of the screen coincides with that of a liquid crystal panel. Otherwise, graphic distortion will be produced in an image on the screen. Thus, in order to place the projector at other locations than a front of the screen, it is necessary to perform calculation for correcting graphic distortion on the screen, which is produced when the projector is placed at other locations than the front of the screen. Furthermore, in order to perform calculation for correcting graphic distortion, positional relation between the screen and the projector is required to be grasped completely. To this end, angles of inclination of the screen and the projector should be measured actually, which is quite troublesome and is difficult in some cases. For example, in case the screen is placed at a location difficult of access or a dangerous spot, it is difficult to actually measure angle of inclination of the screen.

Meanwhile, supposing that a projection type display in which the projector can be placed at other locations than the front of the screen is put on the market, the user should measure angles of inclination of the screen and the projector. In this case, a known procedure in which a protractor or the like is used for measuring the angles of inclination of the screen and the projector is quite unfamiliar to the user and thus, the product becomes quite difficult to use. In addition, unless the user is skilled in the measurement, accurate measurement may not be performed.

Therefore, in the prior art projection type displays, since actual measurement of angles of inclination of the screen and the projector is troublesome, difficult and quite unfamiliar to the user, it has been difficult to place the projector at other locations than the front of the screen.

SUMMARY OF THE INVENTION

Accordingly, an essential object of the present invention is to provide an angle measuring method and an angle measuring apparatus employing a projection type display, which lighten restrictions on location for installing a screen and enable a user to easily perform angular measurement accurately even if the user is not skilled in the angular measurement.

In order to accomplish this object of the present invention, an angle measuring method according to the present invention comprises the steps of: forming an original graphic on an original graphic forming face; projecting the original graphic onto a screen so as to form a projected graphic on the screen; and deforming the original graphic so as to turn the projected graphic into a predetermined shape such that a first angle formed, in a first plane orthogonal to a reference installation face for installing the original graphic forming face and the screen, between the screen and a first perpendicular drawn relative to the reference installation face, a second angle formed, in a second plane parallel to the reference installation face, between the screen and the original graphic forming face and a third angle formed, in the first plane, between a second perpendicular drawn relative to the original graphic forming face and the reference installation face are obtained.

By this method of the present invention, since operation for deforming the original graphic is performed so as to turn the projected graphic on the screen into the predetermined shape such that the angles are measured indirectly, it is not necessary to measure the angles of inclination of the screen and the projector by using an angle scale such as a protractor. Therefore, even in the case where it is difficult to measure the angle of inclination of the screen, for example, the screen is installed at a high spot, the angle of inclination of the screen can be measured easily, rapidly and quite safely. Furthermore, in accordance with the present invention, such a great effect is achieved that since operation for angular measurement can be performed easily, the angles can be easily measured even by a user who is not skilled in the angular measurement.

BRIEF DESCRIPTION OF THE DRAWINGS

This object and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Hereinbelow, an angle measuring apparatus and an angle measuring method according to one embodiment of the present invention are described with reference to the drawings. In this embodiment, the present invention is applied to an apparatus for measuring angles of inclination of a projector and a screen in a liquid crystal projection type display.

Figure 1:
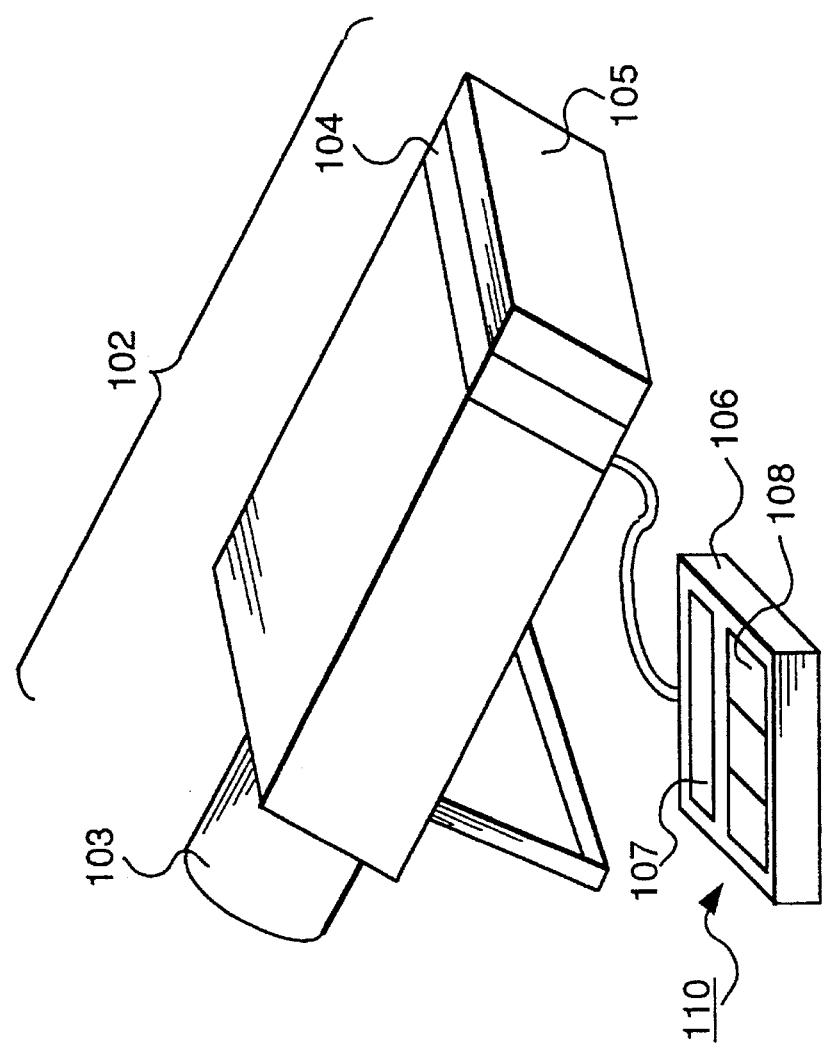
FIG. 1 is a perspective view of an angle measuring apparatus according to the present invention.
Figure 1:
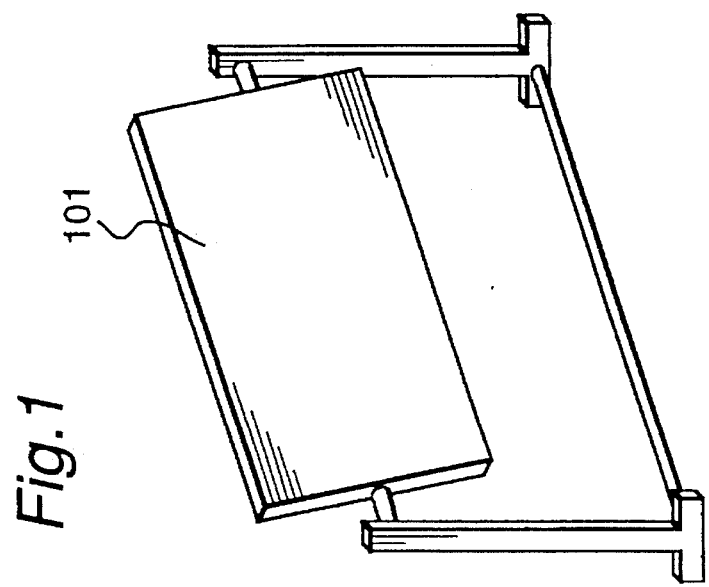

FIG. 1 shows an angle measuring apparatus according to the present invention. In FIG. 1, the angle measuring apparatus includes a screen 101, a projector 102 and an operating unit 110. The projector 102 includes a projection lens 103, a liquid crystal panel 104 and a backlight unit 105, while the operating unit 110 includes a straight line drawing/angle calculating portion 106, a calculated angle display portion 107 and an operational key portion 108. The operational key portion 108 is further constituted by an UP key, a DOWN key and a NEXT key.

Figure 2:
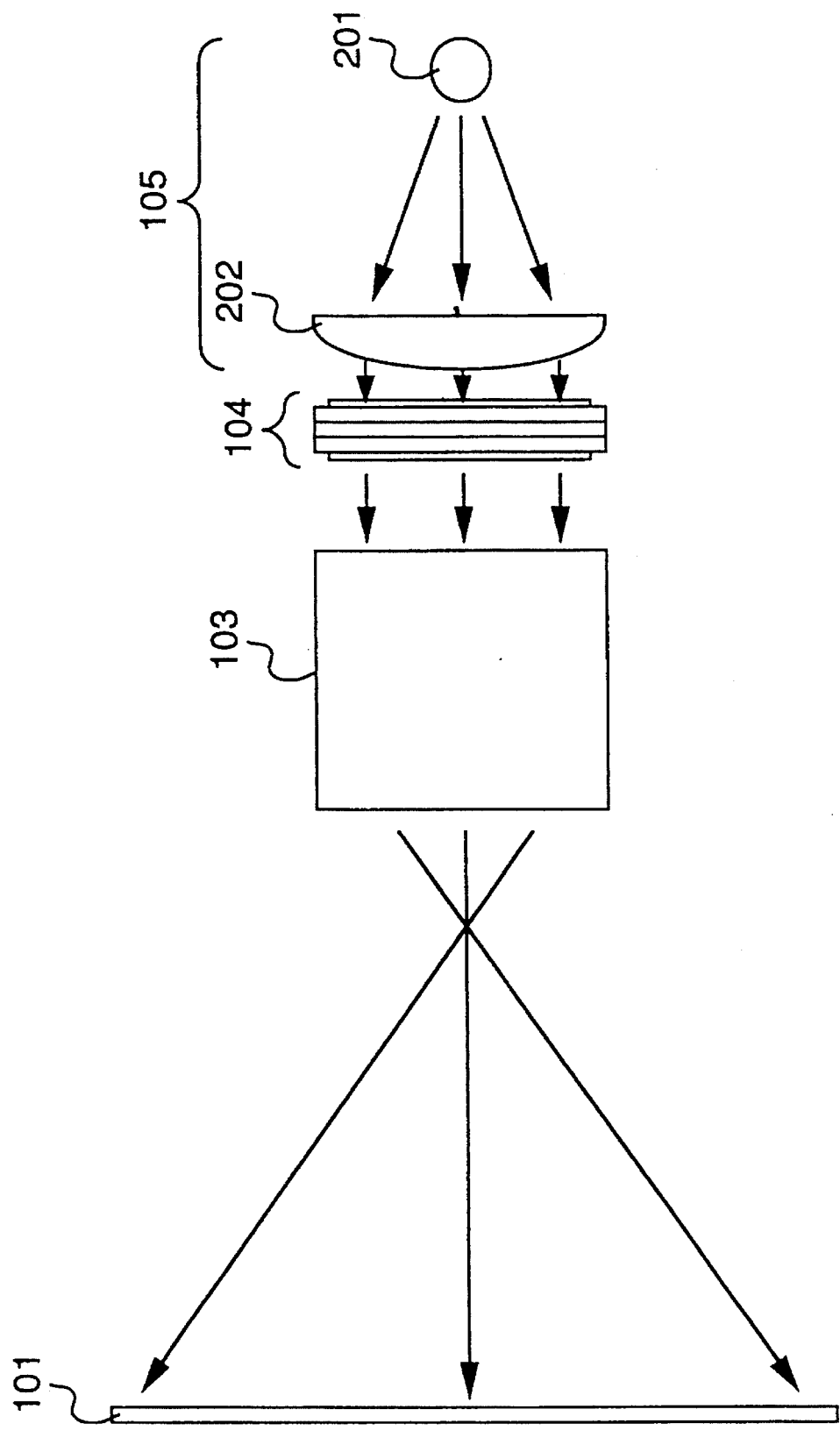
FIG. 2 is a schematic view of an optical system of the angle measuring apparatus of FIG. 1.

Operation of the angle measuring apparatus of the above described arrangement is described with reference to FIGS. 1 to 3, hereinbelow. FIG. 2 shows an optical system including the screen 101 and the projector 102 in the angle measuring apparatus of FIG. 1. The backlight unit 105 is constituted by a lamp 201 and a condenser lens 202. From a video signal produced by the straight line drawing/angle measuring portion 106 of FIG. 1, an image is formed on the liquid crystal panel 104 as difference of optical transmittance. A light ray emitted by the backlight unit 105 turns the formed image into an image having optical density. This image is, in turn, projected onto the screen 101 on an enlarged scale by the projection lens 103. As a result, a large image is formed on the screen 101.

Figure 11:
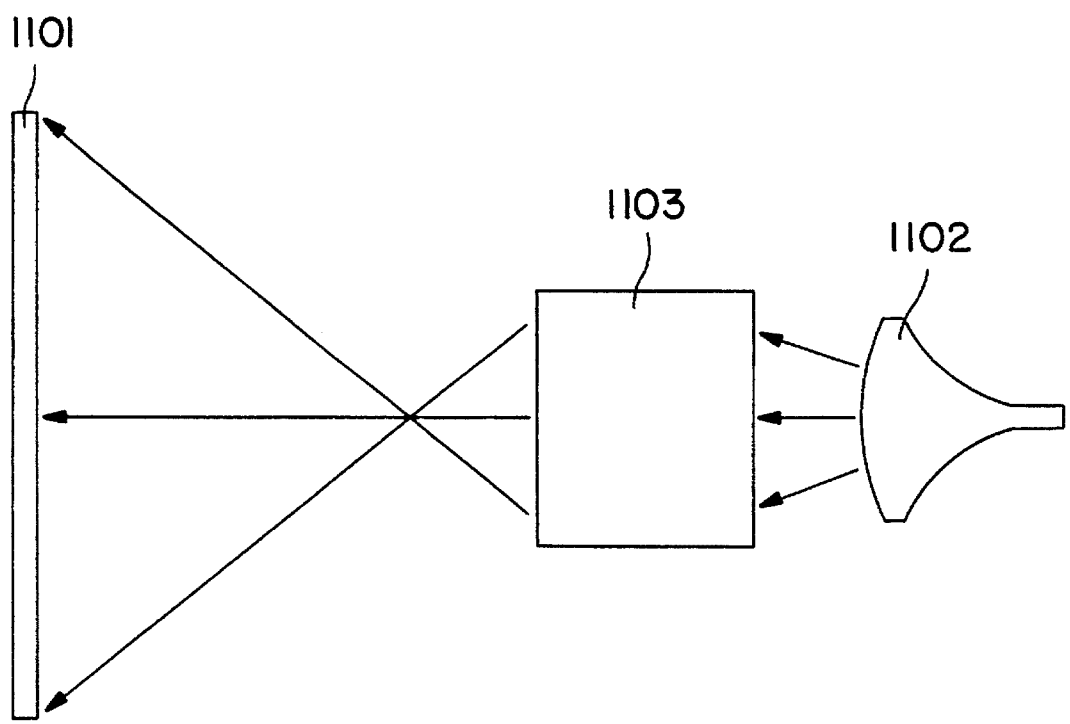
FIG. 11 is a schematic view of another embodiment of an optical system of the angle measuring apparatus of FIG. 1.

FIG. 11 shows another embodiment of an optical system which includes a screen 1101, a self light emitting type display device 1102 and a projection lens 1103. In the embodiment in FIG. 11, the self light emitting type display device 1102 is a cathode-ray tube.

Figure 3:
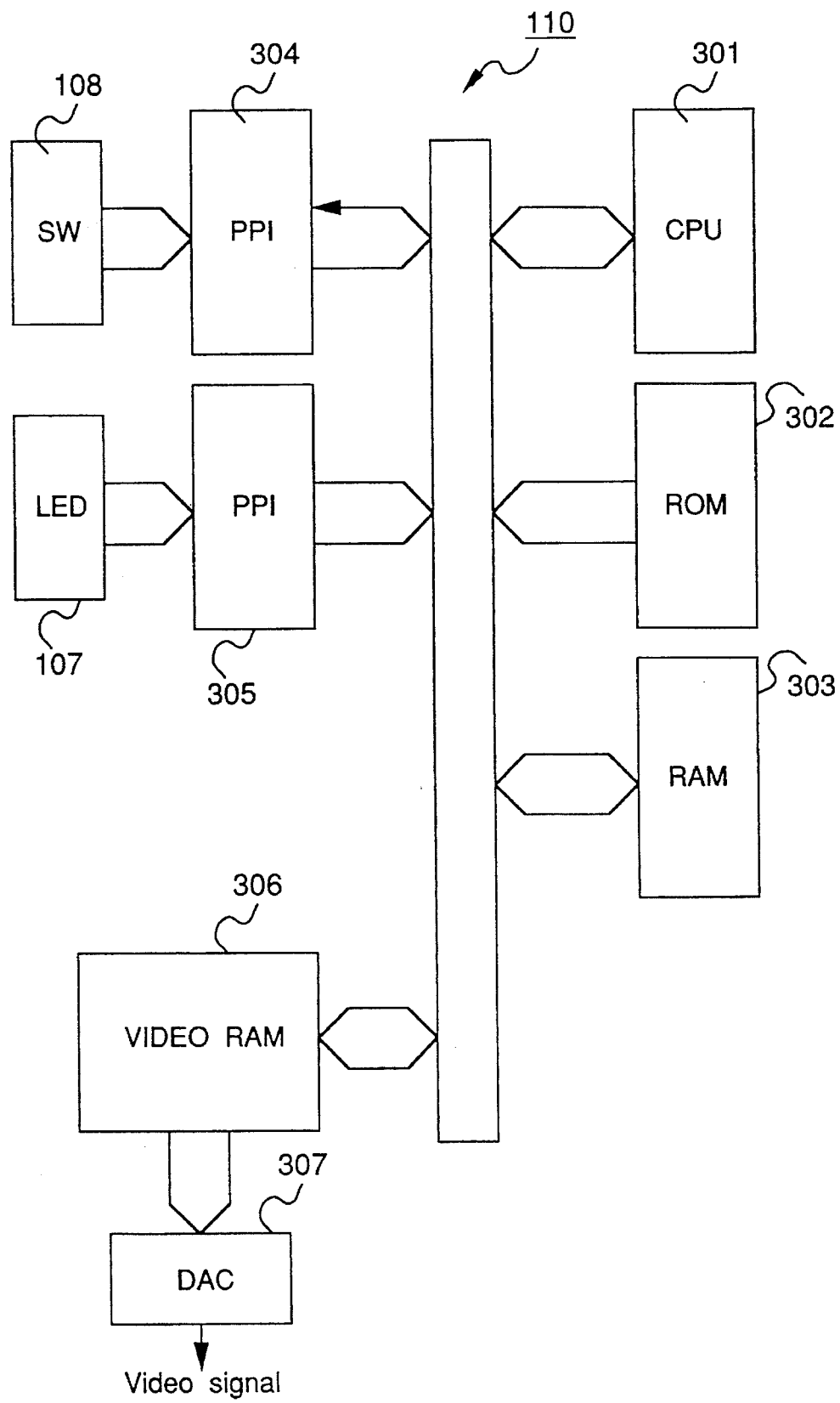
FIG. 3 is a block diagram of an operating unit employed in the angle measuring apparatus of FIG. 1.

FIG. 3 shows a electric circuit of the operating unit 110. The operating unit 110 includes a central processing unit (CPU) 301, a read-only memory (ROM) 302, a random access memory (RAM) 303, a programmable peripheral interface (PPI) 304 for switch input, a PPI 305 for LED display, a video RAM 306 and a digital-to-analog converter 307. Line drawing processing, angular calculation, reading of key input in the operational key portion 108 and display processing of angular data are performed by the CPU 301. A straight line image is written in the video RAM 306 and data of the video RAM 306 is subjected to digital-to-analog conversion into a video signal by the digital-to-analog converter 307. The liquid crystal panel 104 is of a configuration having 720 dots×480 lines and incorporates a polarizer and a drive circuit. When the video signal is supplied to the liquid crystal panel 104, the liquid crystal panel 104 is capable of displaying an image.

Figure 4:
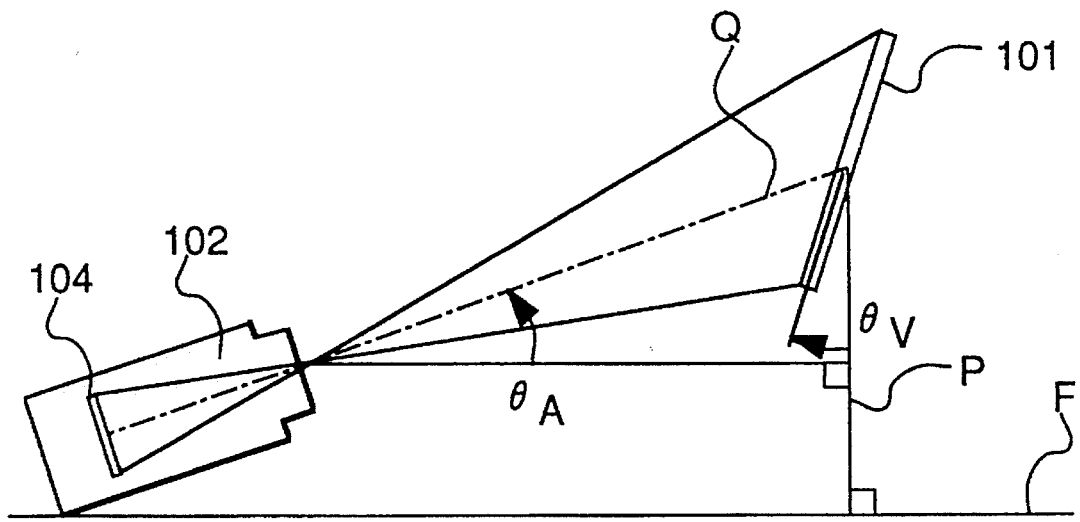
FIG. 4 is a side elevational view of the angle measuring apparatus of FIG. 1.
Figure 5:
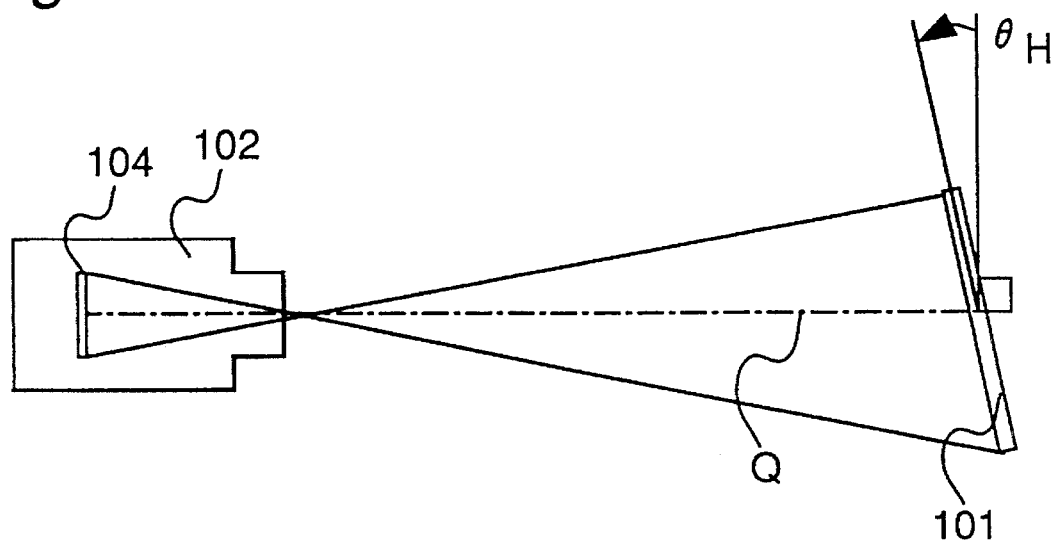
FIG. 5 is a top plan view of the angle measuring apparatus of FIG. 1.

FIG. 4 shows the angle measuring apparatus of the present invention as observed sidewise, i.e. in parallel with a floor F acting as a reference installation face for the screen 101 and the projector 102, while FIG. 5 shows the angle measuring apparatus of the present invention as observed from above, i.e. orthogonally to the floor F. FIG. 4 defines a vertical angle $\theta_V$ of inclination of the screen 101, which is formed, in a vertical plane orthogonal to the floor F, between the screen 101 and a perpendicular P drawn relative to the floor F and a vertical angle $\theta_A$ of inclination of the projector 102, which is formed, in the vertical plane, between an optical axis Q of the projector 102 perpendicular to the liquid crystal panel 104 and the floor F. On the other hand, FIG. 5 defines a horizontal angle $\theta_H$ of inclination of the screen 101, which is formed, in a horizontal plane parallel to the floor F, between the screen 101 and the liquid crystal panel 104. Meanwhile, in case a cathode-ray tube (CRT) is employed in place of the liquid crystal panel 104, the backlight unit 105 can be eliminated because the CRT is a self light emitting type display device.

At the time of angular measurement, a straight line image is drawn by the straight line drawing/angle calculating portion 106 and is formed on the liquid crystal panel 104. Angle of inclination of the straight line image can be controlled by operating the keys of the operational key portion 108. By setting angle of inclination of the straight line image to a specific value, the vertical angle $\theta_V$ of inclination of the screen 101, the horizontal angle $\theta_H$ of inclination of the screen 101 and the vertical angle $\theta_A$ of inclination of the projector 102 are calculated by the straight line drawing/angle calculating portion 106 and the calculational results of the straight line drawing/angle calculating portion 106 are displayed by the calculated angle display portion 107.

Figure 6:
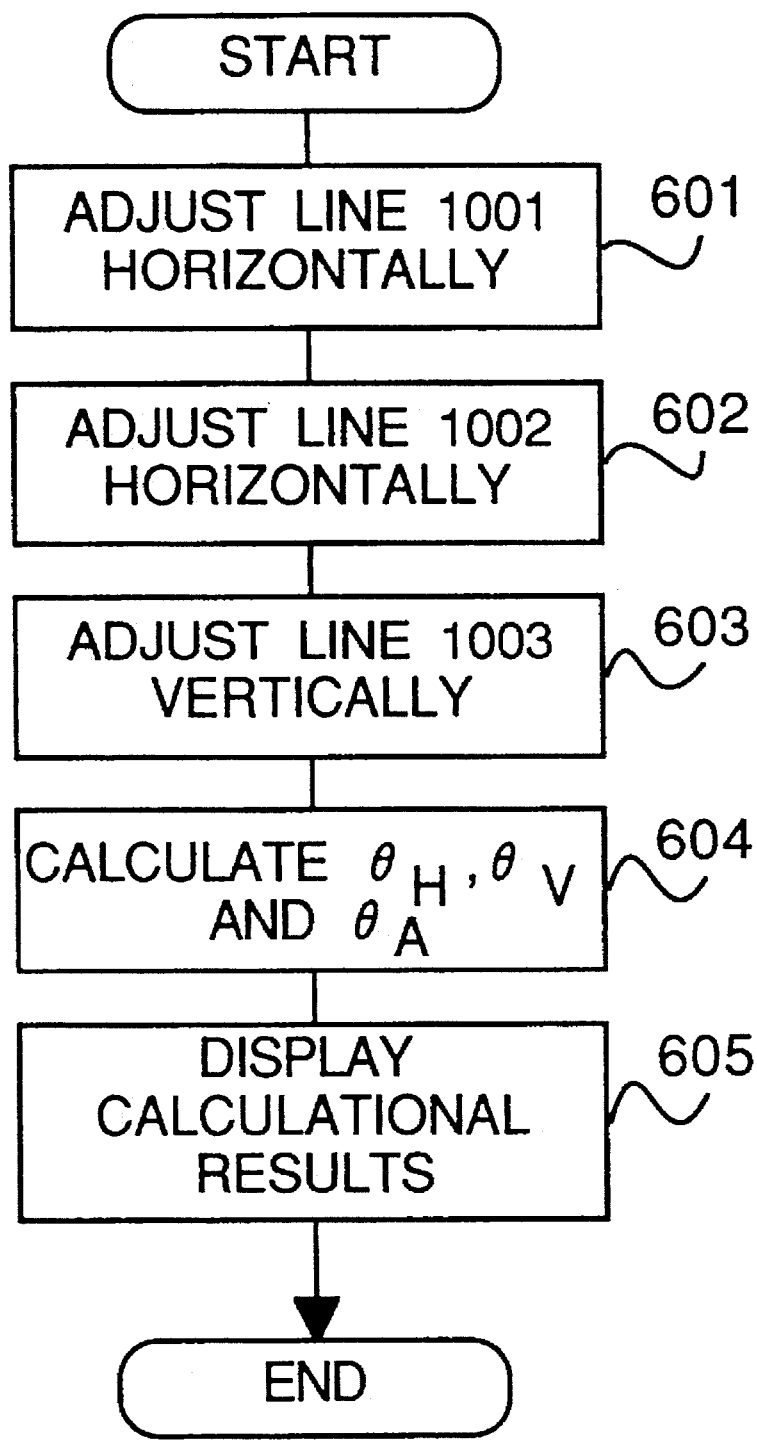
FIG. 6 is a flow chart of an angle measuring method of the present invention.
Figure 7:
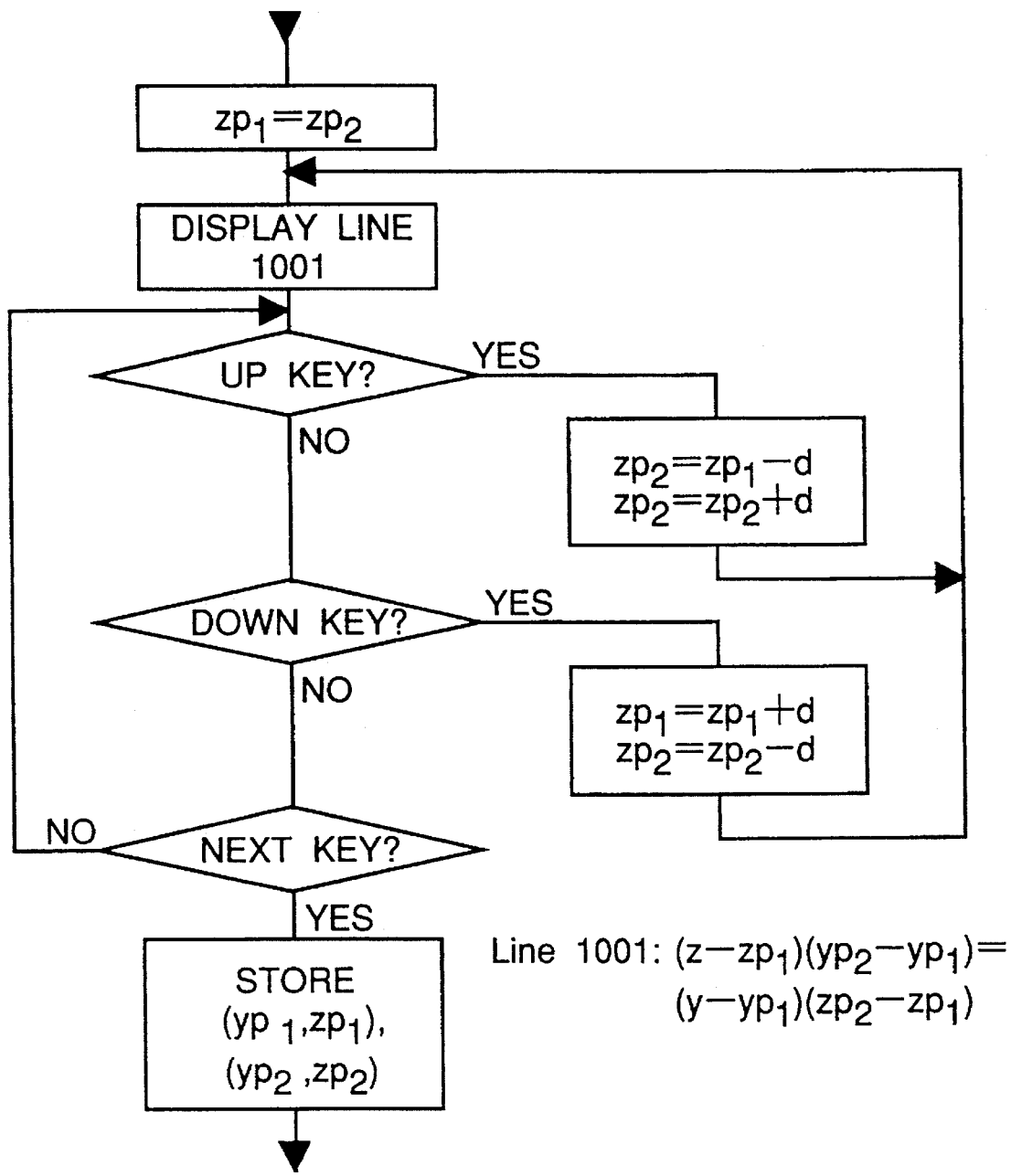
FIG. 7 is a flow chart showing detailed processings of step 601 in FIG. 6.
Figure 8:
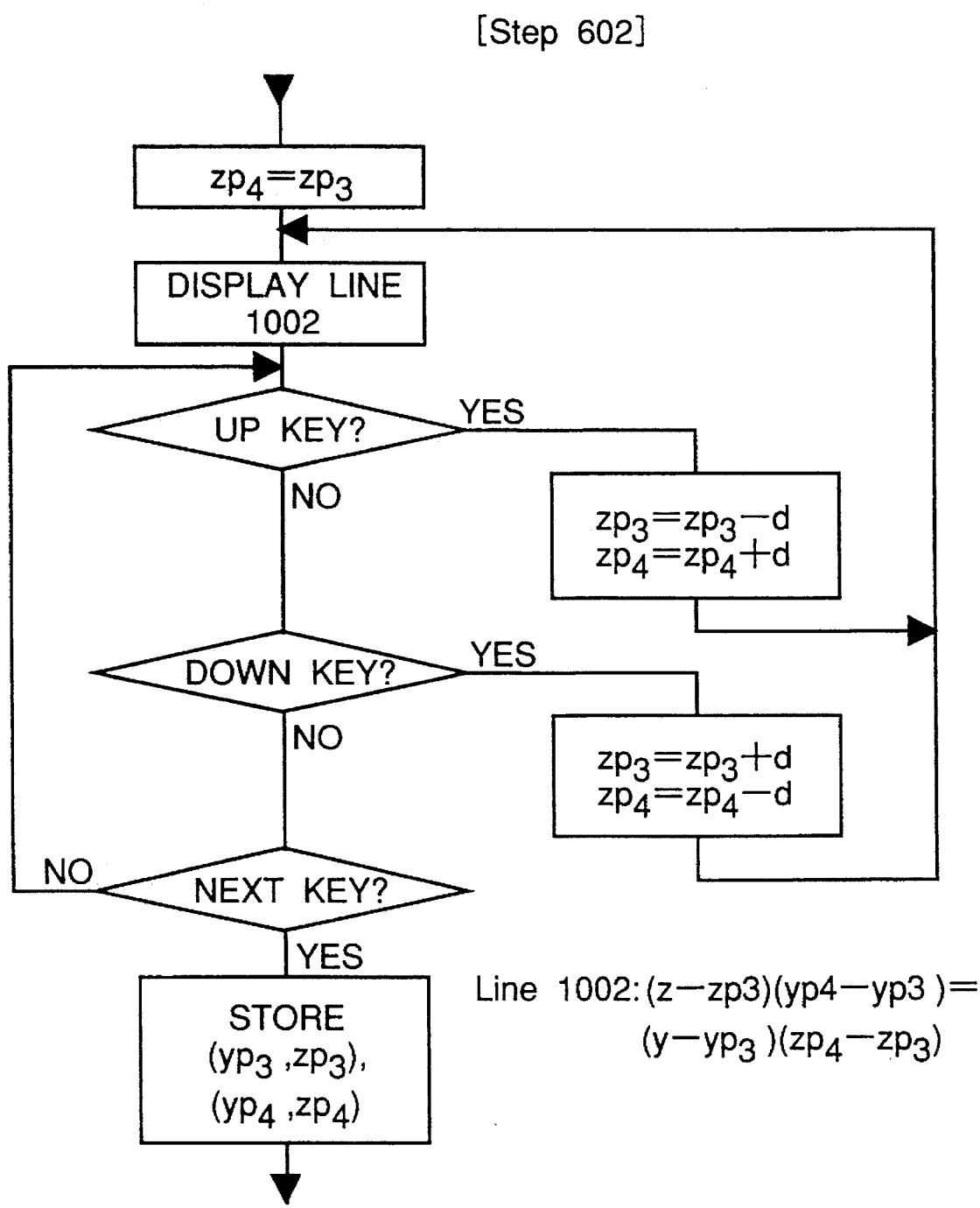
FIG. 8 is a flow chart showing detailed processings of step 602 in FIG. 6.
Figure 9:
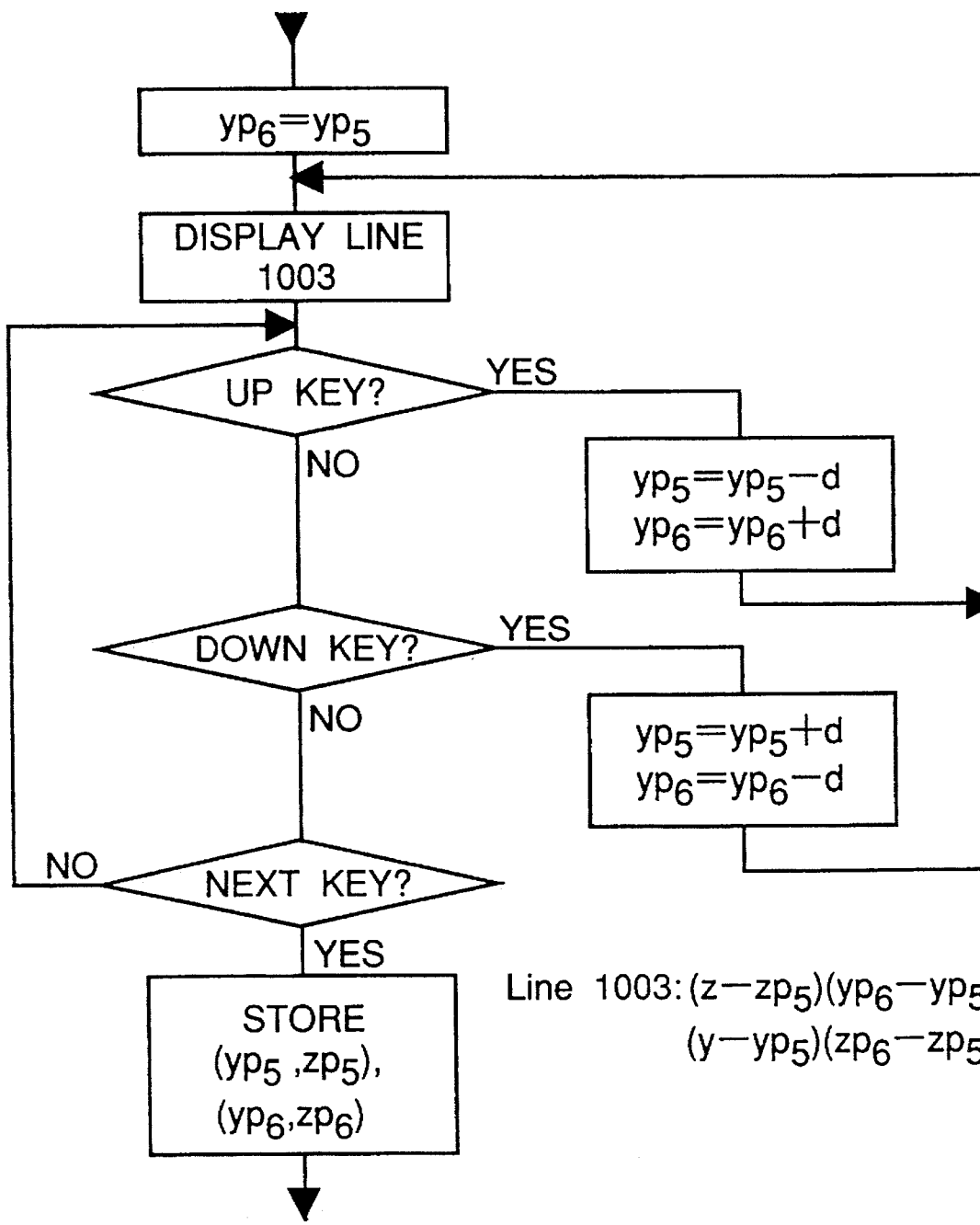
FIG. 9 is a flow chart showing detailed processings of step 603 in FIG. 6.
Figure 10:
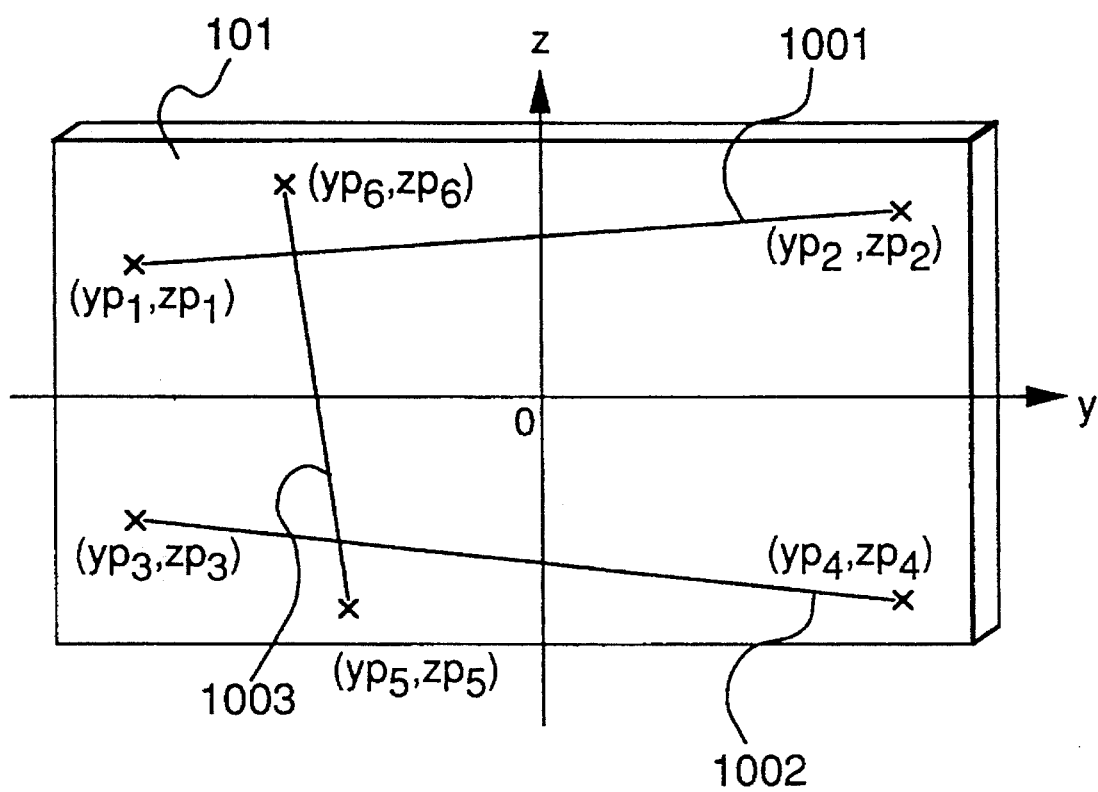
FIG. 10 is a view showing a graphic drawn on a screen at the time of angular measurement in the angle measuring method of of FIG. 6.

Hereinbelow, the angle measuring method of the present invention is described with reference to FIGS. 6 to 10. FIG. 6 is a flow chart of the angle measuring method of the present invention. FIGS. 7, 8 and 9 shows steps 601, 602 and 603 of FIG. 6 in detail, respectively, while FIG. 10 shows a graphic drawn on the screen 101 at the time of angular measurement in the angle measuring method of the present invention. However, it should be noted that coordinates in FIG. 10 are those on the liquid crystal panel 104.

Prior to angular measurement, a graphic is projected onto the screen 101. At this time, the screen 101 and the projector 102 should be installed such that a projection distance between the screen 101 and the projector 102 assumes a preset value. After installation of the screen 101 and the projector 102 has been completed, the following operations are performed.

[Step 601]

At this step, the keys of the operational key portion 108 are operated such that a straight line 1001 shown in FIG. 10 becomes horizontal. A user performs this key operation while viewing the image projected onto the screen 101. Processing of the straight line drawing/angle calculating portion 106 is shown in the flow chart of FIG. 7. Initially, a straight line satisfying $z_{p1}=z_{p2}$ is displayed. When the projector 102 has been placed in front of the screen 101, the straight line 1001 becomes a horizontal line without the need for operating the keys of the operational key portion 108. Input of the three keys of the operational key portion 108 is detected. Thus, if the UP key has been depressed, inclination of the straight line 1001 is increased. On the contrary, in case the DOWN key has been depressed, inclination of the straight line 1001 is reduced. Meanwhile, if the NEXT key has been depressed, the program flow proceeds to the next step by judging that the straight line has been made horizontal.

[Step 602]

At this step, the keys of the operational key portion 108 are operated such that a straight line 1002 shown in FIG. 10 becomes horizontal. The user performs this key operation while viewing the image projected onto the screen 101. Processing of the straight line drawing/angle calculating portion 106 is shown in the flow chart of FIG. 8. Since step 602 is similar to step 601 except for that the straight line 1001 in step 601 is replaced by the straight line 1002 in step 602, the further description is abbreviated for the sake of brevity.

[Step 603]

At this step, the keys of the operational key portion 108 are operated such that a straight line 1003 shown in FIG. 10 becomes vertical. The user performs this key operation while viewing the image projected onto the screen 101. Processing of the straight line drawing/angle calculating portion 106 is shown in the flow chart of FIG. 9. Since step 603 is similar to step 601 except for that the straight line 1001 in step 601 is replaced by the straight line 1003 in step 603, the further description is abbreviated for the sake of brevity.

[Step 604]

At this step, the horizontal angle $\theta_H$ of inclination of the screen 101, the vertical angle $\theta_A$ of inclination of the projector 102 and the vertical angle $\theta_V$ of inclination of the screen 101 are, respectively, calculated by equations (11), (10) and (22) to be described in detail later.

[Step 605]

At this step, the calculational results of step 604 are displayed by the calculated angle display portion 107.

Meanwhile, in this embodiment, the projection distance between the screen 101 and the projector 102 is set to a fixed value. However, if a focusing mechanism is provided at the projection lens 103 and an adjustment amount of the focusing mechanism is detected by a sensor so as to be inputted to the straight line drawing/angle calculating portion 106, the projection distance may be readily variable.

Hereinbelow, a method of calculating the angles $\theta_H$, $\theta_A$ and $\theta_V$ of inclination in step 604 is described. [Calculation of the horizontal angle $\theta_H$ of inclination of the screen 101 and the vertical angle $\theta_A$ of inclination of the projector 102]

Initially, calculation of the horizontal angle $\theta_H$ of inclination of the screen 101 and the vertical angle $\theta_A$ of inclination of the projector 102 is described. As shown in FIG. 10, the straight line 1001 has opposite ends $(Y_{p1}, z_{p1})$ and $(Y_{p2}, z_{p2})$, while the straight line 1002 has opposite ends $(Y_{p3}, z_{p3})$ and $(Y_{p4}, z_{p4})$. It is assumed here that the following parameters such as a projection distance L, a magnifying power m, a horizontal effective display dimension w of the liquid crystal panel 104, a vertical effective display dimension h of the liquid crystal panel 104, a horizontal axial deviation amount $k_y$ and a vertical axial deviation amount $k_z$ are known. At this time, the above horizontal and vertical axial deviation amounts $k_y$ and $k_z$ represent horizontal and vertical deviation amounts between the optical axis Q of the optical system and a center of the liquid crystal panel 104 per horizontal effective display dimension w and vertical effective display dimension h of the liquid crystal panel 104, respectively. For example, when the optical axis Q of the optical system coincides with the center of the liquid crystal panel 104, $k_y=0$ and $k_z=0$. On the other hand, if the center of the liquid crystal panel 104 deviates from the optical axis Q of the optical system through 0.5w horizontally and through 0.5h vertically, namely, the optical axis Q of the optical system falls on a left lower corner of the liquid crystal panel 104 when viewed from the projector 102 towards the screen 101, $k_y=0.5$ and $k_h=0.5$.

The following equations (1) to (3) are set for the straight line 1001.

$$A_{p1}=Y_{p1}-Y_{p2} \tag{1}$$

$$B_{p1}=Y_{p1}Z_{p2}-Y_{p2}Z_{p1} \tag{2}$$

$$C_{p1}=Z_{p1}-Z_{p2} \tag{3}$$

Meanwhile, the following equations (4) to (6) are likewise set for the straight line 1002

$$A_{p2}=Y_{p3}-Y_{p4} \tag{4}$$

$$B_{p2}=Y_{p3}Z_{p4}-Y_{p4}Z_{p3} \tag{5}$$

$$C_{p2}=Z_{p3}-Z_{p4} \tag{6}$$

Furthermore, at this time, the following equation (7) is set.

$$W=(B_{p1}C_{p2}-B_{p2}C_{p1})/(A_{p1}C_{p2}-A_{p2}C_{p1}) \tag{7}$$

When $W \neq 0$, the following equation (8) is defined.

$$r=LW/\sqrt{L^2+W^2} \tag{8}$$

When $W=0$ and $\theta_H \neq 0$, the following relation (9) is obtained.

$$r=0 \tag{9}$$

From the equation (8) or the relation (9), the vertical angle $\theta_A$ of inclination of the projector 102 is given by the following equation (10).

$$\theta_A = \sin^{-1}(r/L) \tag{10}$$

Meanwhile, the horizontal angle $\theta_H$ of inclination of the screen 101 is given by the following equation (11):

$$\tan\theta_H = \frac{-pL(Z_{p1}-Z_{p2})}{rp(Y_{p1}-Y_{p2})+(L-r\sin\theta_A)(Y_{p1}Z_{p2}-Y_{p2}Z_{p1})} \tag{11}$$

where:

$$p=\sqrt{L^2-r^2} \tag{12}$$

$$Y_{p1}=m(Y_{p1}+w \cdot k_y) \tag{14}$$

$$Z_{p1}=m(z_{p1}+h \cdot k_z) \tag{15}$$

$$Y_{p2}=m(Y_{p2}+w \cdot k_y) \tag{16}$$

$$Z_{p2}=m(z_{p2}+h \cdot k_z) \tag{17}$$

$$Y_{p3}=m(Y_{p3}+w \cdot k_y) \tag{18}$$

$$Z_{p3}=m(z_{p3}+h \cdot k_z) \tag{19}$$

$$Y_{p4}=m(Y_{p4}+w \cdot k_y) \tag{20}$$

and $$Z_{p4}=m(z_{p4}+h \cdot k_z) \tag{21}.$$

[Calculation of the vertical angle $\theta_V$ of inclination of the screen 101]

As shown in FIG. 10, the straight line 1003 has opposite ends $(Y_{p5}, z_{p5})$ and $(y_{p6}, z_{p6})$. The vertical angle $\theta_V$ of inclination of the screen 101 is given by the following equation (22):

$$\tan\theta_V = \frac{p(y_1-y_2)}{p(z_2-z_1)\sin\theta_H - r(y_2-y_1)\cos\theta_H - (z_1y_2-z_2y_1)\cos\theta_H} \tag{22}$$

where:

$$p=\sqrt{L^2-r^2} \tag{23}$$

$$\sin\theta_A=r/L \tag{25}$$

$$Y_1=L \cdot Y_{p5}\cos\theta_A/L\cos\theta_A-z_{p5}\sin\theta_A \tag{26}$$

$$Y_2=L \cdot Y_{p6}\cos\theta_A/(L\cos\theta_A-z_{p6}\sin\theta_A) \tag{27}$$

$$z_1 = L \cdot Z_{p5} / (L\cos\theta_A - z_{p5}\sin\theta_A) \quad (28)$$

$$z_2 = L \cdot Z_{p6} / (L\cos\theta_A - z_{p6}\sin\theta_A) \quad (29)$$

$$Y_{p5} = m(Y_{p5} + w \cdot k_y) \quad (30)$$

$$Z_{p5} = m(z_{p5} + h \cdot k_z) \quad (31)$$

$$Y_{p6} = m(Y_{p6} + w \cdot k_y) \quad (32)$$

and $$Z_{p6} = m(z_{p6} + h \cdot k_z) \quad (33).$$

If the vertical angle $\theta_A$ of inclination of the projector 102 is fixed or an inclination sensor is used when the projector 102 is placed on a floor, the vertical angle $\theta_A$ of inclination of the projector 102 is known. In this case, operations and calculations substantially identical with those of a case in which the vertical angle $\theta_A$ of inclination of the projector 102 is unknown are performed and thus, only different portions of the operations and the calculations are described for the sake of brevity. In the angle measuring operations, step 602 becomes unnecessary. Namely, the number of straight lines to be adjusted may be two. As a result, calculations of the equations (1) to (6), (9) and (10) become unnecessary.

As is clear from the foregoing description of the present invention, the image of the straight lines is formed on the liquid crystal panel so as to be projected onto the screen and by changing inclinations of the straight lines of the projected image such that the straight lines extend horizontally and vertically, the vertical angle of inclination of the projector and the horizontal and vertical angles of inclination of the screen are calculated.

Needless to say, the present invention is not restricted to the above embodiment. Therefore, shape of the screen, shape of the graphic projected onto the screen, the procedure for forming the original graphic and the angles to be obtained are not limited to those described above.

What is claimed is:

1. An angle measuring method comprising the steps of:
    forming an initial test graphic on an original graphic forming face;
    projecting the initial test graphic onto a screen so as to form a projected graphic on the screen;
    deforming the initial test graphic so as to turn the projected graphic into a predetermined shape; and
    identifying the extent of the deformation of the initial test graphic in turning the projected graphic into the predetermined shape.

2. An angle measuring method as claimed in claim 1, wherein the original graphic forming face is formed by a display device for forming an image through control of optical transmittance.

3. An angle measuring method as claimed in claim 1, wherein the original graphic forming face is formed by a self light emitting type display device.

4. An angle measuring method as claimed in claim 1, wherein the initial test graphic is formed by a plurality of straight lines.

5. The angle measuring method of claim 1, wherein the initial test graphic is formed by a plurality of straight lines each having an angle of inclination; and
    the initial test graphic is deformed by adjusting the angle of inclination of the straight lines.

6. The angle measuring method of claim 5, wherein the identifying step includes:
    determining a first screen inclination angle as a function of the angle of inclination of the straight lines, the first screen inclination angle formed in a first plane orthogonal to a reference installation face for installing the original graphic forming face and the screen, between the screen and a first perpendicular drawn relative to the reference installation face;
    determining a projector inclination angle as a function of the angle of inclination of the straight lines, the projector inclination angle formed in a second plane parallel to the reference installation face, between the screen and the original graphic forming face; and
    determining a second screen inclination angle as a function of the angle of inclination of the straight lines, the second screen inclination angle formed in the first plane, between a second perpendicular drawn relative to the original graphic forming face and the reference installation face.

7. The angle measuring method of claim 6, wherein the reference installation face is a floor.

8. An angle measuring method comprising the steps of:
    forming an initial test graphic on an original graphic forming face;
    projecting the initial test graphic onto a screen so as to form a projected graphic on the screen;
    deforming the initial test graphic so as to turn the projected graphic into a predetermined shape; and
    identifying the extent of the deformation of the initial test graphic in turning the projected graphic into the predetermined shape.

9. An angle measuring method as claimed in claim 8, wherein the original graphic forming face is formed by a display device for forming an image through control of optical transmittance.

10. An angle measuring method as claimed in claim 8, wherein the original graphic forming face is formed by a self light emitting type display device.

11. An angle measuring method as claimed in claim 8, wherein the initial test graphic is formed by a plurality of straight lines.

12. The angle measuring method of claim 8, wherein the initial test graphic is formed by a plurality of straight lines each having an angle of inclination; and
    the initial test graphic is deformed by adjusting the angle of inclination of the straight lines.

13. The angle measuring method of claim 12, wherein the identifying step includes:
    determining a screen inclination angle as a function of the angle of inclination of the straight lines, the screen inclination angle formed in a first plane orthogonal to a reference installation face for installing the original graphic forming face and the screen, between the screen and a first perpendicular drawn relative to the reference installation face; and
    determining a projector inclination angle as a function of the angle of inclination of the straight lines, the projector inclination angle formed in a second plane parallel to the reference installation face, between the screen and the original graphic forming face.

14. The angle measuring method of claim 13, wherein the reference installation face is a floor.

15. An angle measuring apparatus comprising:
    an original graphic forming portion for forming an initial test graphic;
    a screen;

an original graphic projecting portion for projecting the initial test graphic onto the screen so as to obtain a projected graphic on the screen;

a control portion for deforming the initial test graphic so as to turn the projected graphic into a predetermined shape; and means for identifying the extent of the deformation of the initial test graphic in turning the projected graphic into the predetermined shape.

16. An angle measuring apparatus as claimed in claim 15, wherein the control portion includes a drawing portion for drawing straight lines and an adjustment portion for adjusting inclinations of the straight lines.

17. An angle measuring apparatus as claimed in claim 15, wherein the original graphic forming portion is a display device for forming an image through control of optical transmittance.

18. An angle measuring apparatus as claimed in claim 15, wherein the original graphic forming portion is a liquid crystal panel.

19. An angle measuring apparatus as claimed in claim 15, wherein the original graphic forming portion is a self light emitting type display device.

20. An angle measuring apparatus as claimed in claim 15, wherein the original graphic forming portion is a cathode-ray tube.

21. The angle measuring apparatus of claim 15, wherein the initial test graphic is formed by a plurality of straight lines each having an angle of inclination and the initial test graphic is deformed by adjusting the angle of inclination of the straight lines so as to turn the projected graphic into a predetermined shape.

22. The angle measuring apparatus of claim 15 wherein said identifying means include:

means for determining a screen inclination angle as a function of the angle of inclination of the straight lines, the screen inclination angle formed in a first plane orthogonal to a reference installation face for installing the original graphic forming face and the screen, between the screen and a first perpendicular drawn relative to the reference installation face; and means for determining a projector inclination angle as a function of the angle of inclination of the straight lines, the projector inclination angle formed in a second plane parallel to the reference installation face, between the screen and the original graphic forming face.

* * * * *